Figure 1:
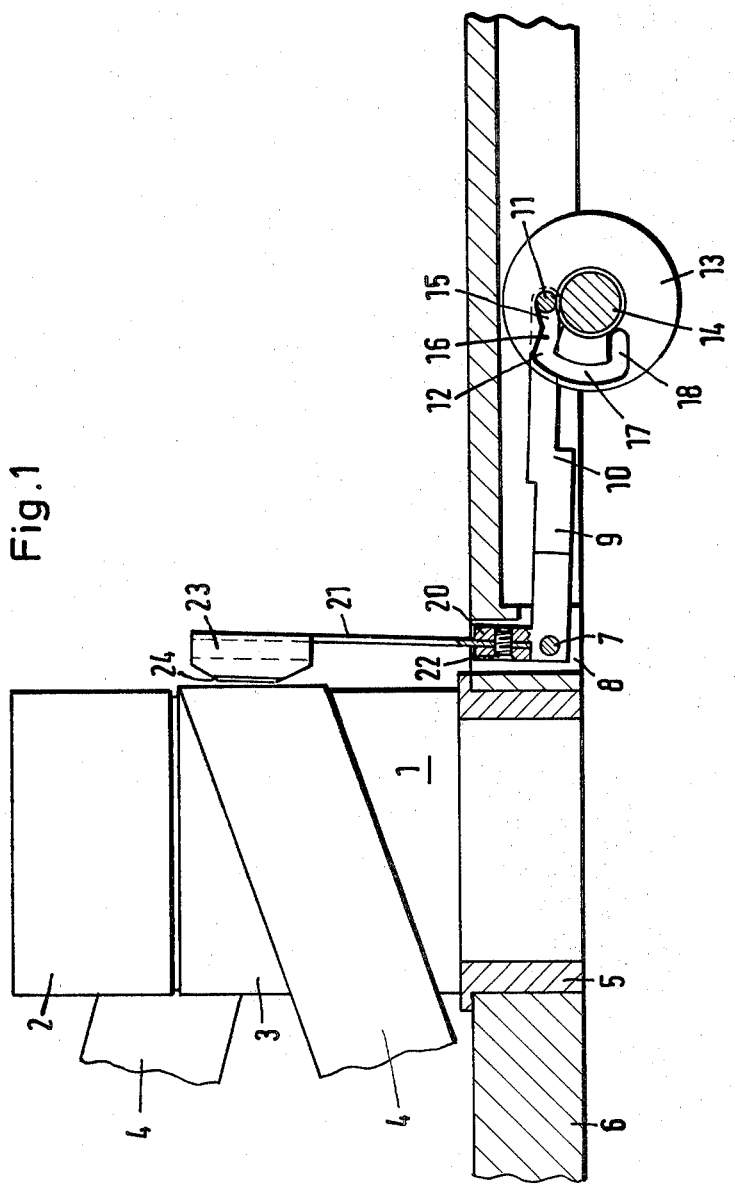

United States Patent [19]

Gunschmann et al.

[11] 4,376,962
[45] Mar. 15, 1983

[54] AUTOMATIC THREADING MAGNETIC TAPE RECORDING APPARATUS, PARTICULARLY VIDEO TAPE RECORDER

[75] Inventors: Peter Gunschmann, Darmstadt; Theo Wolf, Rossdorf, both of Fed. Rep. of Germany

[73] Assignee: Robert Bosch GmbH, Stuttgart, Fed. Rep. of Germany

[21] Appl. No.: 206,567

[22] Filed: Nov. 13, 1980

[30] Foreign Application Priority Data

Nov. 30, 1979 [DE] Fed. Rep. of Germany ....... 2948196

[51] Int. Cl.³ ..................... G11B 15/22; G11B 15/66; G11B 15/60
[52] U.S. Cl. ................................ 360/130.32; 360/95; 360/130.21
[58] Field of Search ...................... 360/130.32, 130.33, 360/95, 93, 137, 96.1, 96.2, 130.21, 130.23, 130.31; 242/194

[56] References Cited

U.S. PATENT DOCUMENTS

| | | | |
|---|---|---|---|
| 3,576,404 | 4/1971 | Akasaka | 360/130.32 |
| 3,672,603 | 6/1972 | Swain | 242/194 |
| 3,838,463 | 9/1974 | Ysbrand | 360/130.32 |
| 4,176,382 | 11/1979 | Froehlich | 360/95 |
| 4,254,922 | 3/1981 | Wolf | 242/194 |
| 4,259,700 | 3/1981 | Gause | 360/95 |
| 4,320,429 | 3/1982 | Knerich | 360/130.32 |

Primary Examiner—Robert M. Kilgore
Attorney, Agent, or Firm—Frishauf, Holtz, Goodman & Woodward

[57] ABSTRACT

To insure maintenance of a fixed position of tape which is being withdrawn from a cassette and looped in a predetermined tape path, a pressing engagement head (23) with a friction surface (24) presses the tape (4) against the scanning device (1) during withdrawal from, or return to, a cassette of the tape. Movement of the head (23) in clamping direction is controlled by a lever (9) which engages a cam (13, 15, 16, 17, 18), rotated by a drive shaft (14) upon withdrawal of the tape from the cassette and placement of the tape into a tape path, the initial position leaving the tape free around the scanning device, withdrawing movement clamping the tape against the scanning device by pivoting of the lever and hence engaging the clamping head (23) against the tape (4) and the tape against the scanning device (1). Preferably, the engagement is resilient, for example by interposition of a leaf spring (21).

8 Claims, 3 Drawing Figures

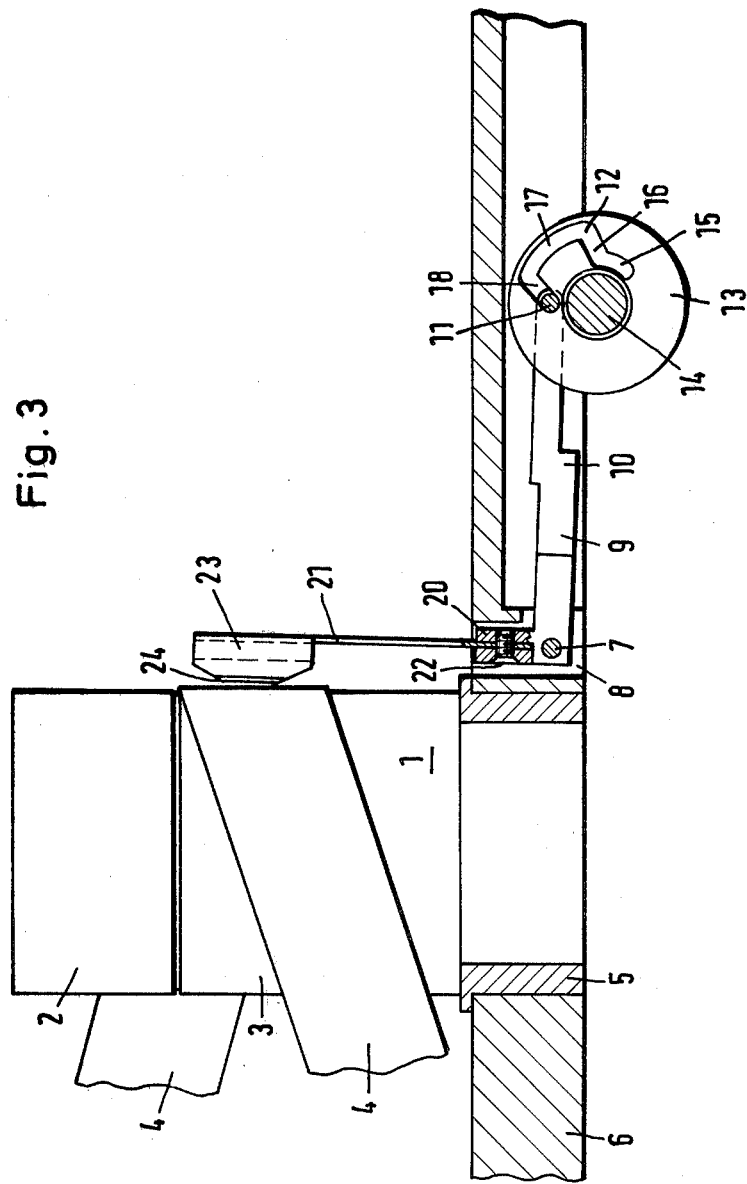

AUTOMATIC THREADING MAGNETIC TAPE RECORDING APPARATUS, PARTICULARLY VIDEO TAPE RECORDER

Reference to related applications and patents, assigned to the assignee of this application, the disclosure of which is hereby incorporated by reference:
U.S. Ser. No. 10,620, filed Feb. 9, 1979, Gause, now U.S. Pat. No. 4,259,700; U.S. Ser. No. 10,816, filed Feb. 9, 1979, Wolf et al, now U.S. Pat. No. 4,254,922.

The present invention relates to tape recording apparatus, and more particularly to the threading mechanism for use with automatically threading video tape cassettes, in which a threading loop is pulled out of the cassette by a threading mechanism.

BACKGROUND AND PRIOR ART

The referenced application Ser. No. 10,620, Gause, now U.S. Pat. No. 4,259,700, describes a magnetic tape recorder apparatus in which a threading mechanism is provided to pull out a loop of tape from a cassette without placing stress on the tape. This is accomplished by coupling a tape supply roller to a mechanically operated threading lever which positively feeds tape from the cassette so that pulling out tape from the cassette does not stress the tape as such by the threading movement. It has been found that this apparatus can be still further improved. Due to the braking effect of the winding motors which are coupled to the tape reels in the cassette, stress is still placed on the tape so that the desired tape threading movement free from all stresses cannot always be obtained. The stress-free feeding of the tape is, however, of substantial importance in order to avoid the possibility of deformation of the tape, particularly during threading movement, and especially if succeeding threading movements affect similar sections of the tape.

The loop which is pulled out from the cassette, for example in accordance with the referenced application Ser. No. 10,816, now U.S. Pat. No. 4,254,922, can also be affected.

THE INVENTION

It is an object to improve threading apparatus, and more particularly apparatus which permits essentially stress-free withdrawal of a stretch of tape from a cassette, especially of the type disclosed in the referenced applications, now Patents.

Briefly, to prevent stress being placed on a cassette due to tendency of apparatus coupled to the reels to haul in tape which has already been pulled out, engagement or pressing means are provided which press the tape against the scanning device, selectively engageable with the tape, and means to control the pressing means to so effect engagement. For positioning of the tape during threading of the tape in the apparatus, the pressing means preferably iclude a control shaft which rotates upon initiation of threading over a limited angle of rotation, the shaft controlling selective engagement or disengagement of the pressing elements engaging the tape and locking it against the scanning device.

The apparatus in accordance with the invention has the advantage that the threading loop which has been pulled out is determined solely by the quantity of tape positioned between the tape drive shaft and the tape presser or counter roller. The apparatus is entirely independent of the type of storage reel or cassette structure or cassette reel. The structure permits, in accordance with a feature of the invention, a simple mechanical arrangement by coupling a central drive shaft to the pressing control element, for example by coupling it to a shaft having limited angular rotation.

DRAWINGS

FIG. 1 is a fragmentary longitudinal section through a tape recording apparatus illustrating tape being pressed against a scanning device, and suitable, for example, for incorporation into the structure of the referenced patent applications, now U.S. Pat. Nos. 4,259,700 issued Apr. 3, 1981, and 4,254,922, issued Apr. 10, 1981.

Figure 2:
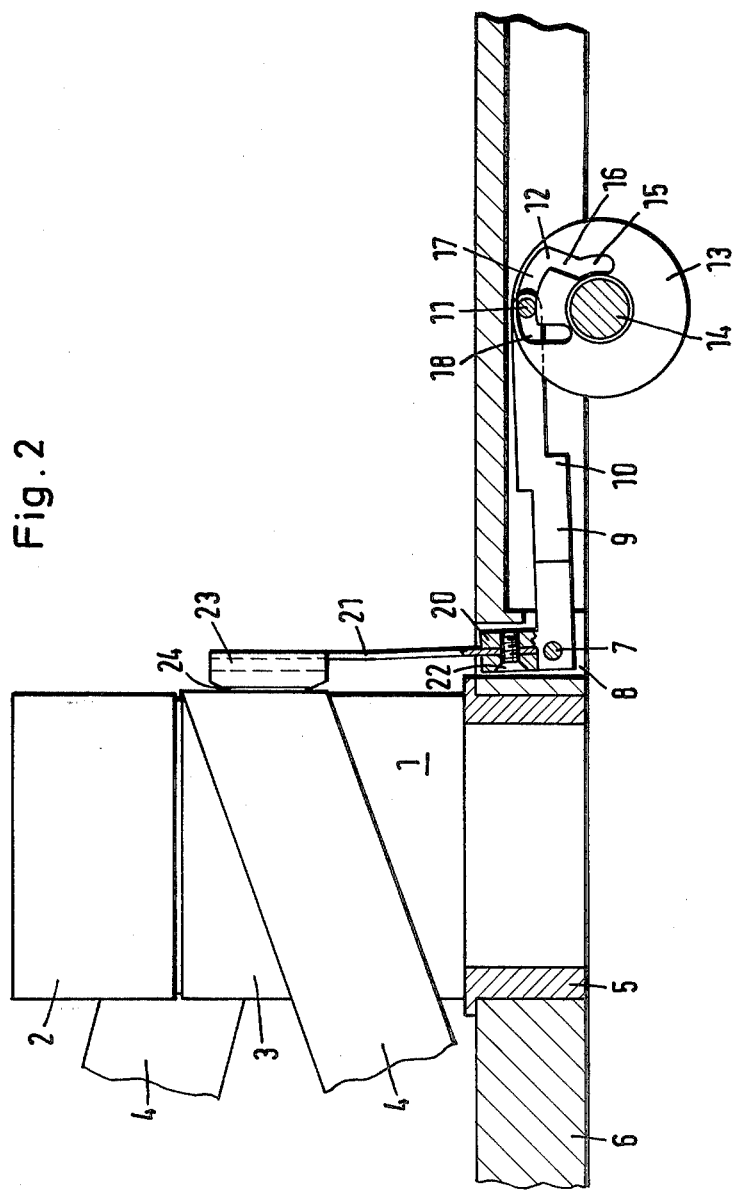

FIGS. 2 and 3 are views similar to FIG. 1, illustrating the apparatus in different positions during the tape threading operation.

A tape 4 is spirally wrapped around a scanning device 1 which has an upper cylinder 2 and a lower cylinder 3, separated by a narrow gap. A transducer head is rotated within the narrow gap, as well known. The tape 4 is wrapped about the head assembly 1 over an angle of approximately 180°.

The lower drum 3 is secured to a base plate 6 of the magnetic tape recording apparatus by an intermediate attachment bushing 5. A shaft 7 located in the recess 8 of the base plate 6 rotatably supports an angled or offset lever 9. The longer end 10 of lever 9 carries a cross pin 11 close to its free end. Pin 11 is guided in a cam track 12 of a cam disk 13 which is secured to a shaft 14, to rotate therewith.

The cam track 12 has various camming portions, merging into each other. A first portion 15 is located close to the axis of rotation of shaft 14, concentric thereto. Portion 15 merges into a second portion 16 which extends towards the outer circumference of cam disk 13. A third portion 17 is again at least approximately concentric with respect to the axis of rotation of shaft 14, but radially farther apart than the first portion 15. The cam track terminates in a fourth portion which extends towards the inside, that is, close to the center of rotation of the cam disk. The angle which the fourth portion 18 makes with respect to a radial line passing through the axis of rotation of shaft 14 is different from the angle which the second portion 16 makes therewith.

The short end 20 of the lever 9 is slotted in a direction parallel to shaft 7. The slot is essentially filed by a leaf spring 21 which extends approximately radially away from the axis 7. The slotted end 20 of the lever 9 is pressed together by a holding screw 22, so that the leaf spring 21 is securely clamped between parallel portions of the lever 20.

The free end of the leaf spring 21 carries a clamping shoe 23 which has a friction surface 24 at the side facing the tape 4. The friction surface can be secured to the shoe 23 in any suitable manner, for example by an adhesive.

Operation, with reference to FIGS. 1–3: The starting position is shown in FIG. 1. In this position, the drive shaft 14 is angularly so located that the cross pin 11 is located close to the beginning of the first portion 15 of the cam track. The cam track portion 15 extends over an angle which, in one embodiment, corresponds to a central angle of about 26°. When shaft 14 rotates about the angle of 26°, the cross pin 11 retains its relative position with respect to the axis of rotation of shaft 14, and lever 9 does not move. The clamping shoe 23 is spaced from the surface of the scanning device 1.

The rotation of the drive shaft 14 about this angle may, for example, correspond to lowering the cassette from a storage position in an operating position—as explained in the cross-referenced applications and patents, in which the tape 4 is placed in its position between the device 1 and the friction surface 24 secured to the shoe 23.

The further sequence of the operation will be shown in FIG. 2. As the shaft 14 continues to rotate in clockwise direction, cross pin 11 will engage the second cam track portion 16. This rotates lever 9 in counter-clockwise direction, and the clamping shoe 23 with the friction surface 24 thereon touches the magnetic tape 4 which is engaged around the surface of the scanning device 1.

The shaft 14 continues to rotate and, consequently, lever 9 is moved further in counter-clockwise direction until the cross pin 11 reaches the radially most remote position from the center of rotation of shaft 14. This causes leaf spring 21 to be pre-stressed, since clamping shoe 23 already has reached its terminal position. The friction surface 24 thus engages the tape with a predetermined contact pressure, determined by the dimension of the spring, the spring modulus, and the angle of rotation of the lever 9. The magnetic tape is thus pressed against the device 1 and prevents longitudinal sliding of the tape 4 on the scanning device 1. Upon further rotation of the shaft 14, predetermined lenghts of the tape are pulled off from a supply reel (not shown) and guided about the guidance and scanning devices of the tape recording apparatus, for example as specifically disclosed and shown in the referenced application Ser. No. 10,620, Gause, now U.S. Pat. No. 4,259,700. During this process, cross pin 11 will engage the portion 17, so that the position of cross pin 11 remote from the axis of shaft 14 will be maintained. The magnetic tape is securely held by the friction surface 24 and will remain pressed on the scanning device 1—see position of FIG. 2.

After the tape loop has been pulled out from the cassette, and upon further rotation of the shaft 14, cross pin 11 engages in the portion 18 of the cam track and reaches the end of the cam guide 12, as illustrated in FIG. 3. This turns the lever 9 in clockwise direction, leaf spring 21 is released, and the shoe 23 with the friction drive 24 is lifted off the tape 4, freeing tape 4 from clamping relationship with the device 1. The magnetic tape recording unit now can operate, with the tape running freely over device 1.

If the tape is to be re-stored in the cassette—not shown—the sequence is reversed. Shaft 14 is rotated in counter-clockwise direction, starting from the position shown in FIG. 3 through the position of FIG. 2 and to the position of FIG. 1. Pin 11 thus passes through the various cam track portions in reverse order, first clamping the tape 4 against the device 1 and then again releasing the tape 4 from clamping relationship against the device 1.

Various changes and modifications may be made, and different arrangement to clamp the tape against the device 1, can be used. The cam track can have different shape and, rather than being formed as a track in a disk, can be formed as an external cam on which a cam follower is held, for example by spring pressure, the movement of the cam follower, as it glides over the cam surfaces, being transferred to a lever or similar arrangement which effects clamping of the tape 4 against the device 1 while the tape is being withdrawn from a cassette and threaded in a tape threading path.

We claim:

1. Magnetic tape recording apparatus, particularly for video tape having
    a cylindrical scanning device (1) over which the tape (4) is guided in a spiral path,
    and comprising, in accordance with the invention,
    means (21–24) selectively engageable with the tape for pressing the tape (4) against the scanning device (1),
    and means (7–18, 20) for selectively moving said pressing means in engagement with the tape and hence to press the tape against the scanning device for locking the tape against the scanning device to prevent movement with respect thereto.

2. Apparatus according to claim 1, wherein the selective moving means further includes camming means (11–18) coupled to said shaft and to said pressing means and selectively controlling the pressing means to engage the shaft in accordance with selected angular positions of said shaft.

3. Apparatus according to claim 1, wherein said pressing means includes a tape brake head (23, 24) located opposite said tape (4) in the region of contact between the tape and the scanning device (1).

4. Apparatus according to claim 3, wherein said pressing means further includes an elongated, resilient element (21) carrying said tape brake head (23, 24) adjacent one free end thereof, and a control lever (9) forming part of said selective moving means securing the other end of said elongated resilient element.

5. Apparatus according to claim 1, wherein said selective moving means includes a cam (13) having a cam track (15–18) and a cam follower (11), the position of the cam follower on the cam track controlling selective engagement of said pressing means against the tape.

6. Apparatus according to claim 4, wherein said pressing means includes a cam (13) having a cam track (12, 15–18) thereon, a cam follower (11) in engagement with said cam track and coupled to said lever to move said lever upon rotation of the shaft controlling rotation of said cam in accordance with the angular position of said shaft.

7. Apparatus according to claim 6, wherein said lever and the cam contour are mutually selected to provide for travel of said elongated resilient element over a distance greater than the distance between the tape brake head and the scanning device to provide for resilient deflection of said elongated resilient element and hence application of resilient pressing force of the tape against the scanning device.

8. Apparatus according to claim 6, wherein said shaft, during threading of the tape, rotates over a predetermined angle of rotation;
    and the cam track (12) includes a track portion (17) which at least approximately extends over said predetermined angle to provide for clamping and pressing of the tape against the scanning device during threading movement of the tape and while said shaft rotates over said predetermined angle.

* * * * *